(12) United States Patent
Abrams et al.

(10) Patent No.: US 9,460,173 B2
(45) Date of Patent: Oct. 4, 2016

(54) METHOD AND SYSTEM FOR METADATA DRIVEN PROCESSING OF FEDERATED DATA

(75) Inventors: Howard A. Abrams, San Mateo, CA (US); Mark J. Addleman, San Francisco, CA (US); Jay M. Cohen, Farmingdale, NY (US)

(73) Assignee: CA, Inc., New York, NY (US)

( * ) Notice: Subject to any disclaimer, the term of this patent is extended or adjusted under 35 U.S.C. 154(b) by 494 days.

(21) Appl. No.: 13/305,036

(22) Filed: Nov. 28, 2011

(65) Prior Publication Data

US 2013/0138681 A1    May 30, 2013

(51) Int. Cl.
*G06F 17/30* (2006.01)

(52) U.S. Cl.
CPC ............... *G06F 17/30566* (2013.01)

(58) Field of Classification Search
CPC ............. G06F 17/30286; G06F 17/30557; G06F 17/30566
USPC ............ 707/971, E17.095, E17.102
See application file for complete search history.

(56) References Cited

U.S. PATENT DOCUMENTS

| | | | |
|---|---|---|---|
| 2006/0265385 A1* | 11/2006 | Agrawal et al. | 707/10 |
| 2009/0006428 A1* | 1/2009 | Kahler et al. | 707/100 |
| 2009/0234799 A1* | 9/2009 | Betawadkar-Norwood et al. | 707/2 |
| 2010/0005077 A1* | 1/2010 | Krishnamurthy et al. | 707/4 |
| 2010/0332990 A1* | 12/2010 | Prahlad et al. | 715/735 |
| 2011/0035512 A1* | 2/2011 | Morimoto | H04L 41/0843 710/8 |
| 2011/0302135 A1* | 12/2011 | Prophete et al. | 707/634 |

OTHER PUBLICATIONS

Jeung, Hoyoung, et al. "Effective metadata management in federated sensor networks." Sensor Networks, Ubiquitous, and Trustworthy Computing (SUTC), 2010 IEEE International Conference on. IEEE, 2010.*
Bray, Bruce E., Joyce A. Mitchell, and Scott P. Narus. "Architecture of a federated query engine for heterogeneous resources." (2009).*
Schenk, Simon, et al. "SemaPlorer—interactive semantic exploration of data and media based on a federated cloud infrastructure." Web Semantics: Science, Services and Agents on the World Wide Web 7.4 (2009): 298-304.*
Heimbigner, et al. "A Federate Architecture for Information Management", ACM Transactions on Office Information Systems, vol. 3, No. 3, Jul. 1985, pp. 253-278.
Teiid—Scalable Information Integration "Teiid Administrator's Guide 7.7", printed Sep. 2011, 62 pages.
Teiid—Scalable Information Integration "Teiid Caching Guide 7.7", printed Sep. 2011, 20 pages.
Teiid—Scalable Information Integration "Teiid Client Developer's Guide 7.7", printed Sep. 2011, 62 pages.
Teiid—Scalable Information Integration "Teiid Developer's Guide 7.7", printed Sep. 2011, 62 pages.
Teiid—Scalable Information Integration "Teiid Quick Start Example 7.7", printed Sep. 2011, 22 pages.
Teiid—Scalable Information Integration "Teiid Reference Documentation 7.7", printed Sep. 2011, 180 pages.

* cited by examiner

*Primary Examiner* — Nan Hutton
(74) *Attorney, Agent, or Firm* — Baker Botts L.L.P.

(57) ABSTRACT

A method includes identifying a first set of metadata associated with a database and retrieving the first set of metadata from one or more first memory locations. The method also includes identifying, based on the first set of metadata, a second set of metadata associated with the database and retrieving the second set of metadata from one or more second memory locations. The method further includes combining the first set of metadata and the second set of metadata into a set of combined metadata.

21 Claims, 3 Drawing Sheets

METHOD AND SYSTEM FOR METADATA DRIVEN PROCESSING OF FEDERATED DATA

TECHNICAL FIELD

The present invention relates generally to federated databases, and, more particularly, to a method and system for metadata driven processing of federated data.

BACKGROUND

A federated database system is a database management system (DBMS) that integrates data from multiple autonomous data sources into a single virtual database, referred to as a federated database. The various data sources may be implemented by any suitable resource for storing and retrieving data, including relational database management systems, text files, and/or web services. The federated database system allows data from all the constituent data sources to be accessed using a single database query without physically merging the databases into a single database.

SUMMARY

In accordance with a particular embodiment, a method may include identifying a first set of metadata associated with a database and retrieving the first set of metadata from one or more first memory locations. The method may also include identifying, based on the first set of metadata, a second set of metadata associated with the database and retrieving the second set of metadata from one or more second memory locations. The method may further include combining the first set of metadata and the second set of metadata into a set of combined metadata. In some embodiments, the database may be a federated database capable of integrating multiple data sources. In such embodiments, the method may further include receiving a database query, analyzing the combined metadata to identify data sources to query for responding to the database query, and transmitting one or more subqueries to the identified data sources. In such embodiments, the method may also include receiving data responsive to the one or more subqueries from the identified data sources, combining the data responsive to the one or more subqueries into a set of combined data, and responding to the database query by providing the combined data.

In particular embodiments, a system may include an interface operable to retrieve a first set of metadata and a second set of metadata associated with a database. The system may also include a processor operable to identify the first set of metadata and operable to identify, based on the first set of metadata, the second set of metadata. The processor may also be operable to combine the first set of metadata and the second set of metadata into a set of combined metadata.

In particular embodiments, a computer readable medium may be embodied with logic that, when executed by a processor, may be operable to identify a first set of metadata associated with a database and may be operable to retrieve the first set of metadata from one or more first memory locations. The logic may also be operable to identify, based on the first set of metadata, a second set of metadata associated with the database and may be operable to retrieve the second set of metadata from one or more second memory locations. The logic may further be operable to combine the first set of metadata and the second set of metadata into a set of combined metadata.

Technical advantages of particular embodiments include a method and system for metadata driven processing of federated data. Particular embodiments may allow a federated database to be dynamically created and/or configured using metadata. Further technical advantages include the ability to use metadata to dynamically re-configure a federated database to include new data sources, data objects, or relationships between data sources and/or data objects. The ability to dynamically create, configure, and/or update a federated database in this manner may result in dramatically reduced development time and costs.

Other technical advantages will be readily apparent to those skilled in the art based on the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION OF THE INVENTION

Figure 1:
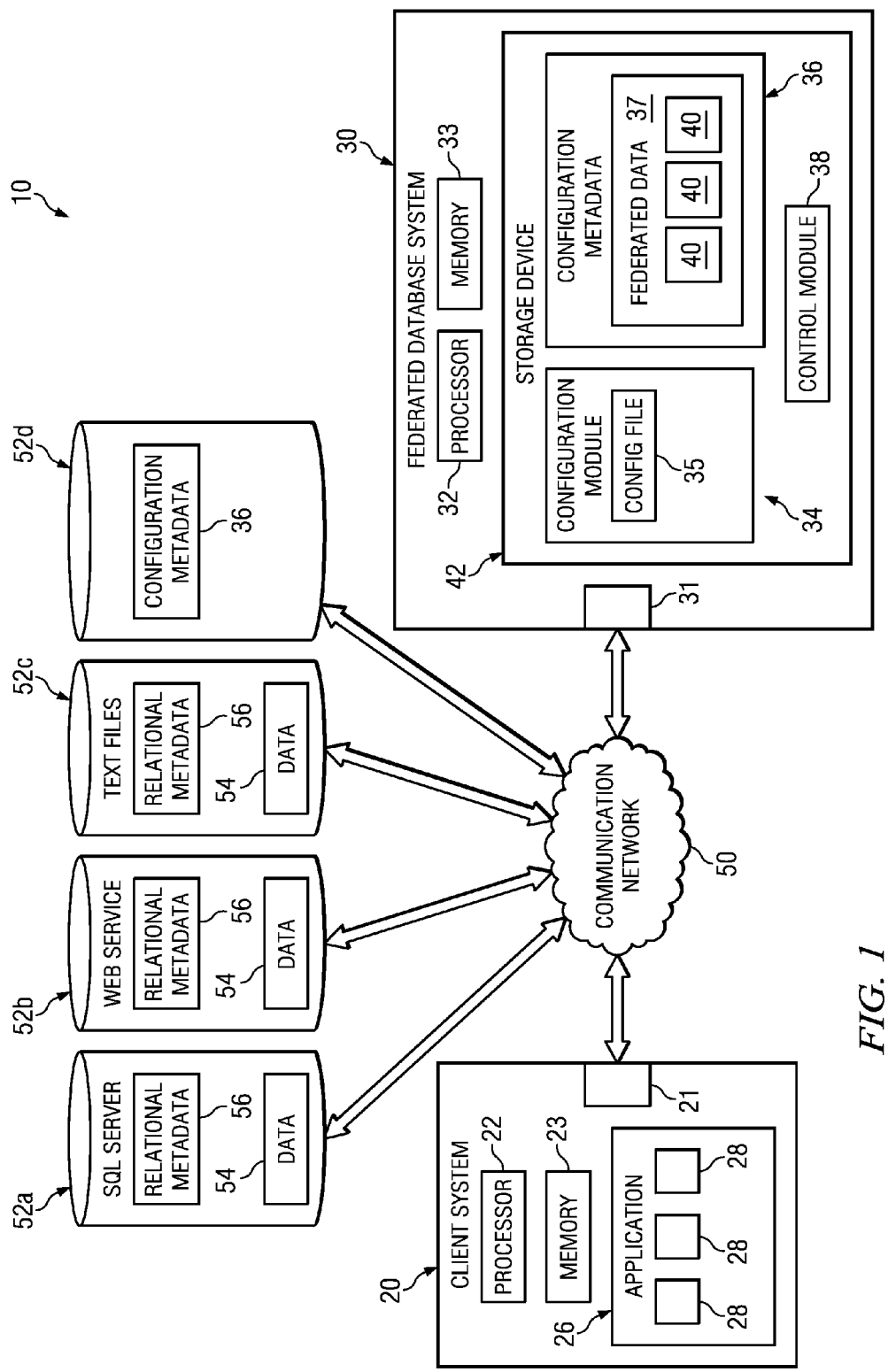
FIG. 1 illustrates a system for metadata driven processing of federated data, in accordance with a particular embodiment.

FIG. 1 illustrates a system 10 for metadata driven processing of federated data, including a client system 20, federated database system 30, communications network 50, and data sources 52. In particular embodiments, federated database system 30 may integrate data sources 52 into a single virtual database, allowing client system 20 to access to the data 54 stored on data sources 52 using a single query to federated database system 30.

Federated database system 30 may be a database management system (DBMS) configured to integrate data 54 from various data sources 52 into a single virtual database. In the illustrated embodiment, federated database system 30 is communicatively coupled to client system 20 and data sources 52 using communications network 50. In other embodiments, federated database system 30 may be implemented locally to client system 20 and/or data sources 52. In the illustrated embodiment, federated database system 30 includes an interface 31, processor 32, memory 33, and storage device 42. Interface 31 may include any suitable hardware, software or encoded logic for transmitting and/or receiving communication signals to and from one or more communications networks, such as communications network 50. Interface 31 may facilitate communications between federated database system 30 and client system 20 and/or data sources 52. Processor 32 may be a microprocessor, controller, or any other suitable computing device, resource, or combination of hardware, software and/or encoded logic operable to perform functionality associated with federated database system 30. Memory 33 may be any form of volatile or non-volatile memory including, without limitation, magnetic media, optical media, random access memory (RAM), read-only memory (ROM), removable media, or any other suitable local or remote memory component, for storing information associated with the functionality discussed herein. Storage device 42 may be any suitable resource for storing data and/or other information, including, without limitation, a magnetic disk, flash memory, optical disk, or any other suitable local or remote data storage device. In the illustrated embodiment, configuration metadata 36 is stored on storage device 42, as well the data and/or instructions associated with configuration module 34 and control module 38.

Client system 20 may communicate with federated database system 30 to access data 54 of data sources 52. Client system 20 may comprise any suitable hardware, software or encoded logic for performing the functionality described herein as associated with the client system. In the illustrated embodiment, client system 20 includes an interface 21, processor 22, memory 23, and application 26. Interface 21 may include any suitable hardware, software or encoded logic for transmitting and/or receiving communication signals to and from one or more communications networks, such as communications network 50. Interface 21 may facilitate communications between client system 20 and federated database system 30 through communications network 50. Processor 22 may be a microprocessor, controller, or any other suitable computing device, resource, or combination of hardware, software and/or encoded logic operable to perform functionality associated with client system 20. Memory 23 may be any form of volatile or non-volatile memory including, without limitation, magnetic media, optical media, random access memory (RAM), read-only memory (ROM), removable media, or any other suitable local or remote memory component, for storing information associated with the functionality discussed herein.

Application 26 of client system 20 may execute on processor 22 and may transmit database queries to federated database system 30. Application 26 may also receive data from federated database system 30 in response to the transmitted database queries. Application 26 may be any suitable combination of hardware, software and/or encoded logic capable of performing the functionality described herein when executed by processor 22. In particular embodiments, application 26 may be a business application configured to provide one or more business services 28. As an example, application 26 may be a mainframe management application configured to provide security, network, and/or database administration services 28. A particular business service 28 may require access to data 54 of one or more of the data sources 52, which may be accomplished by querying federated database system 30. In some embodiments, application 26 may be may implemented to allow new business services 28 to be dynamically provisioned. The provision of new business services 28 may require access to one or more additional data sources 52, which may require re-configuration of federated database system 30.

Communications network 50 may facilitate communications among client system 20, federated database system 30, and/or data sources 52. Communications network 50 may be any interconnection of components capable of transmitting communication signals, data, and/or messages, such as a local area network (LAN), wide area network (WAN), global distributed network (e.g., the Internet), Intranet, Extranet, or any other form of wireless or wireline communication network.

Data sources 52 may include any suitable resource for storing data 54 and/or other information, such as the relational metadata 56 associated with data 54, and/or the configuration metadata 36 associated with the configuration of federated database system 30. For example, data sources 52 may include, without limitation, a database or database server (e.g., an SQL database or server), a web service provided by a web-server, and/or one or more files stored using the file system of a storage device (e.g., a text file, CSV file, or spreadsheet). In the illustrated embodiment, data sources 52 are communicatively coupled to federated database system 30 and client system 20 over communications network 50. In other embodiments, data sources 52 may be implemented locally to client system 20 and/or federated database system 30.

In particular embodiments, federated database system 30 may be implemented with functionality of a relational database and/or object-relational database. A relational database and/or object-relational database may comprise data 54 stored in tables and may also include relational metadata 56 describing the data 54 stored in the tables. In particular embodiments, the relational metadata 56 may define objects 40 with one or more properties, and the tables may store instances of each defined object 40. For example, each row of a table may contain data 54 associated with an instance of an object 40, and the columns may correspond to the properties of the object 40. A relational or object-relational database may be capable of performing various actions on the data 54 stored in the tables, including searching the data 54 based on specified criteria and/or combining data 54 from multiple tables. Searching an SQL database may be performed using a "select" command. Data 54 from multiple tables may be combined by joining specific columns from each table. This may be performed on an SQL database using a "join" command. Multiple tables may also be combined by merging the rows of each table into single table. This may be performed on an SQL database using a "union" command.

Federated database system 30 may provide virtualized access to the data 54 stored on data sources 52 using configuration metadata 36. In particular embodiments, configuration metadata 36 may define the manner in which data sources 52 are integrated. For example, configuration metadata 36 may describe a set of "virtual" federated data 37 as one or more tables with one or more columns that are supplied with data 54 from various data sources 52. In such embodiments, each table may represent an object 40 and each column may represent the properties of the object 40. Configuration metadata 36 may specify the data sources 52 that supply the data 54 necessary to populate a particular table and/or column, and configuration metadata 36 may also define the relationships among the tables and/or objects of federated data 37. As an example, configuration metadata 36 may define federated data 37 as one or more objects 40 having one or more properties, and configuration metadata 36 may specify that certain objects 40 and/or properties are populated by a data source 52 implemented by an SQL server, while other objects 40 and/or properties are populated by a data source 54 implemented by a web service. In this example, configuration metadata 36 may specify the authentication credentials for the SQL server and may specify the URL for the web service. Although federated database system 30 may store and maintain its own set of configuration metadata 36, the underlying data 54 and/or relational metadata 56 may be stored on data sources 52 rather than federated database system 30. In this manner, federated database system 30 may "virtualize" access to data 54 and/or relational metadata 56 by retrieving data 54 and/or relational metadata 56 from data sources 52 only when necessary to respond to a database query.

In particular embodiments, configuration metadata 36 may need to be configured and/or populated before virtualized access to data sources 52 may be provided. In such embodiments, configuration metadata 36 may reside locally on federated database system 30 and/or may reside at one or more remote locations. In embodiments where configuration metadata 36 resides, at least in part, at one or more remote locations, configuration metadata 36 may need to be retrieved from the particular locations by federated database system 30. In particular embodiments, one or more data sources (e.g., data source 52d) may store configuration metadata 36. Thus, while some data sources 52 may supply the underlying data 54 that is integrated by federated database system 30 (e.g., data sources 52a, 52b, 52c), some data sources 52 may supply the configuration metadata 36 used to configure federated database system 30 (e.g., data source 52d). Configuration file 35 may specify the information necessary to configure and populate configuration metadata 36. Configuration file 35 may be a CSV file, XML file, spreadsheet, or any other suitable file or mechanism for storing configuration information. Configuration file 35 may supply the initial configuration metadata 36 (e.g., initial object 40 definitions, relationships among objects 40, and/or the data sources 52 necessary to populate the objects 40) and may also specify the various sources of additional configuration metadata 36 (e.g., data source 52d). The additional configuration metadata 36 may create and/or modify object 40 and relationship definitions, and may specify additional data sources (e.g., data sources 52a, 52b, 52c) that supply the underlying data 54 associated with the new or modified object 40 and/or relationship definitions. In this manner, certain data sources may provide additional configuration metadata 36 (e.g., data source 52d) but may not necessarily provide the underlying data 54 used to populate the objects 40 of federated data 37. However, in particular embodiments, a data source 52 may provide configuration metadata 36 as well as the underlying data 54. Configuration module 34 may consult configuration file 35 to identify the additional sources of configuration metadata 36 and may retrieve configuration metadata 36 from the appropriate locations. The retrieved configuration metadata 36 from each location may be a comprehensive set or may also specify one or more locations of additional configuration metadata 36. Configuration module 34 may recursively retrieve configuration metadata 36 until it reaches a steady state indicating that all the requisite configuration metadata 36 has been retrieved. After reaching a steady state, each set of retrieved configuration metadata 36 may be combined to form a single set of configuration metadata 36. In particular embodiments, configuration metadata 36 may be stored as a table formed by the union of all the constituent sets of configuration metadata 36.

After retrieving and populating configuration metadata 36, federated database system 30 may receive and process database queries from client system 20 using configuration metadata 36. For example, upon receiving a database query from client system 20, configuration metadata 36 may identify the data sources 52 that contain the underlying data 54 (e.g., data sources 52a, 52b, 52c) and thus need to be queried in order to respond to the database query. For each data source 52 that needs to be queried, federated database system 30 may generate one or more subqueries and may transmit the subqueries to the appropriate data sources 52. In particular embodiments, a template language (e.g., Apache Velocity) may be used to transform the database query into a new query composed of one or more subqueries, such as the join or union of the one or more subqueries. In such embodiments, federated database system 30 may decompose the new query into the constituent subqueries and may transmit the subqueries to the appropriate data sources 52. Upon receiving the subqueries, the data sources 52 may retrieve data 54 responsive to the subqueries and may transmit the responsive data 54 to federated database system 30. Federated database system 30 may integrate the received data 54 and may provide the integrated data to client system 20. In some embodiments, federated database system 30 may consult configuration metadata 36 to determine how to integrate data 54. For example, configuration metadata 36 may specify the objects 40 and/or properties of federated data 37 that are populated by each data source 52, and federated database system 30 may integrate the data 54 of each data source 52 accordingly.

In this manner, data 54 and/or relational metadata 56 of data sources 52 may be "virtualized," meaning data 54 and/or relational metadata 56 may be integrated without being physically stored on federated database system 30. Instead, data 54 and/or relational metadata 56 may be retrieved from data sources 52 only when necessary to respond to a database query. In particular embodiments, relational metadata 56 may be "localized" with respect to a particular language (e.g., a language specified by the user of application 26) or according to any other characteristics. Localization may allow federated database system 30 to respond to database queries in multiple languages. In some embodiments, the localization may be accomplished by forming a union of relational metadata 56 with a localization table. In such embodiments, the localization table may also stored on each data source 52 and access to the localization table may be "virtualized" in the same manner as its associated relational metadata 56.

In particular embodiments, federated database system 30 may also include capability to dynamically re-configure itself to integrate data 54 from additional data sources 52 and/or to create and/or modify object 40 and relationship definitions. As an example, configuration file 35 may be updated to specify the location of additional configuration metadata 36 associated with an updated configuration. Configuration module 34 may then retrieve the additional configuration metadata 36 from the specified location, and if necessary, continue to recursively retrieve additional configuration metadata 36 until reaching a steady state as described above. In embodiments where application 26 is a business application providing one or more business services 28, the provision of a new business service 28 may require dynamic re-configuration of federated database system 30. In such embodiments, federated database system 30 may be dynamically re-configured in the manner described above to reflect the provision of the new business service 28.

Figure 2:
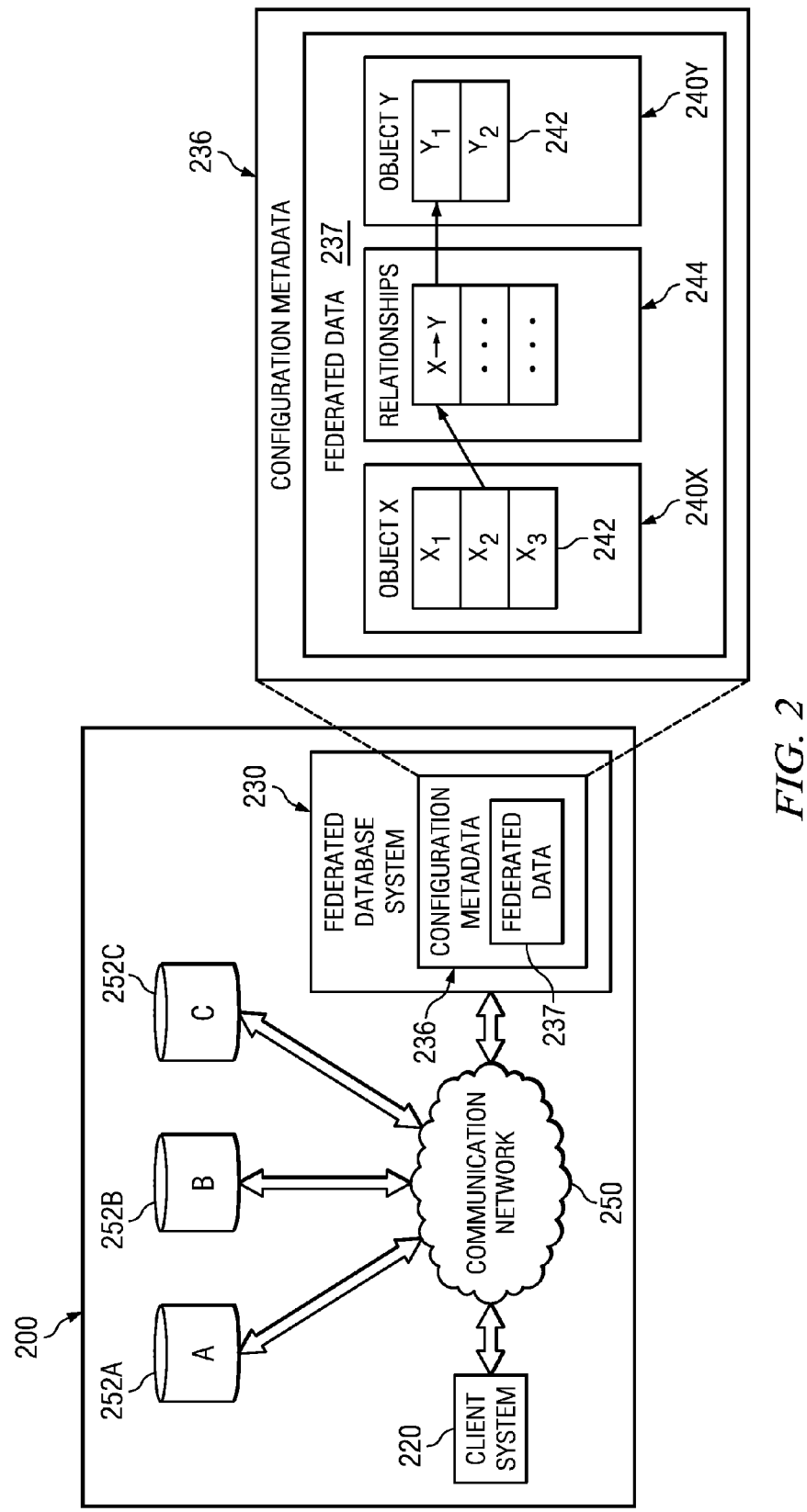
FIG. 2 illustrates aspects of configuration metadata in a system for metadata driven processing of federated data, in accordance with a particular embodiment.

FIG. 2 illustrates aspects of configuration metadata 236 in a system 200 for metadata driven processing of federated data. In the illustrated embodiment, system 200 includes client system 220, federated database system 230, data sources 252, and communications network 250. In particular embodiments, federated database system 230 may integrate data sources 252 into a single virtual database, allowing client system 220 to access the data stored on data sources 252 using a single query to federated database system 230. Federated database system 230 may be similar to federated database system 30 of FIG. 1, client system 220 may be similar to client system 20 of FIG. 1, data sources 252 may be similar to data sources 52 from FIG. 1, and communications network 250 may be similar to communications network 50 of FIG. 1.

Federated database system 230 may include configuration metadata 236, which may be similar to configuration metadata 36 from FIG. 1, and federated database system 230 may also include federated data 237, which may be similar to federated data 37 from FIG. 1. Federated database system 230 may use configuration metadata 236 to define a set of federated data 237 for providing virtualized access to the data from data sources 252. Configuration metadata 236 may specify information associated with federated data 237, such as the objects 240 and/or properties 242 associated with federated data 237 and the data sources 252 necessary to populate federated data 237. Configuration metadata 236 may also define groupings of properties 242 of an object 240, actions that may be taken on an object 240, and/or relationships 244 among objects 240. Relationships 244 may identify a correlation between objects 240 of different types. In particular embodiments, an object 240 may be defined as a table with columns corresponding to the properties 242 of the object 240. In such embodiments, the rows of the table may correspond to instances of the object 240, which may be populated by the data from data sources 252 in response to a database query. In this manner, configuration metadata 236 may store the definition of an object 240, while the actual instances of the object 240 may reside on data sources 252 and may only be accessed when necessary to respond to a database query.

In particular embodiments, configuration metadata 236 may need to be configured and/or populated before virtualized access to data sources 252 may be provided. In such embodiments, configuration metadata 236 may reside locally on federated database system 230 and/or may initially reside at one or more remote locations and may need to be retrieved by federated database system 230. In such embodiments, some or all of configuration metadata 236 may reside remotely at one or more data sources 252. Thus, while some data sources 252 may supply the underlying data that is integrated by federated database system 230, some data sources 252 may supply the configuration metadata 236 used to configure federated database system 230. In this manner, data sources 252 may define the objects 240 and/or relationships 244 of federated data 237 by providing the appropriate configuration metadata 236.

In particular embodiments, an object 240 may be defined by more than one data source 252. For example, in the illustrated embodiment, data source A may have provided configuration metadata 236 that defines an object X having properties X1 and X2, and data source B may have provided configuration metadata 236 that adds property X3 to object X. Thus, in this example, object X may be defined by both data source A and data source B. In addition, in particular embodiments, relationships 244 between objects 240 may be defined by data sources 252 other than the data sources 252 that defined the objects 240. For example, the illustrated embodiment depicts a relationship 244 between object X and object Y, which, given an instance of object X, may allow federated database system 230 to identify an instance of a related object Y. Although object X and object Y may be defined by the configuration metadata 236 provided by data sources A and B, the relationship 244 may be defined by configuration metadata 236 provided by data source C.

In addition, instances of an object 240 may be populated with the data from a data source 252 other than the data source 252 that defined the particular object 240. For example, in the illustrated embodiment, object X may be defined by configuration metadata 236 provided by data source A, while instances of object X may be populated by data from data source B. In particular embodiments, instances of an object 240 may also be populated by more than one data source 252. For example, data source B and data source C may both store instances of object X. In this example, the set of all instances of object X may be formed by the union of the instances of object X from data source B with the instances of object X from data source C. In particular embodiments, instances of an object 240 may be populated with data from more than data source 252 to provide an object-relational approach to object inheritance. For example, object X may have properties X1 and X2; object Y may have properties X1, X2, Y1, Y2; and object Z may have properties X1, X2, Z1, Z2. In this example, objects X, Y, and Z may share common properties X1 and X2. Data source B may store instances of object Y and data source C may store instances of object Z. In this particular example, instances of object X may be populated by forming the union of instances of objects Y from data source B with instances of object Z from data source C over properties X1 and X2. A corresponding instance of either object Y or object Z may be identified for each instance of object X, and accordingly, actions associated with either object Y or Z may be performed on the particular instance of object X.

In particular embodiments, a single instance of an object 240 may be populated by combining data from one or more data sources 252. For example, object X may have properties X1, X2, X3; object Y may have properties X1, X2; and object Z may have property X3. Instances of object Y may be stored on data source B, and instances of object Z may be stored on data source C. In this example, instances of object X may be populated by performing a join over properties X1 and X2 from instances of object Y and property X3 from instances of object Z.

In particular embodiments, relationships 244 between objects 240 may be defined using a "relationship query." For example, SQL queries may be used to define relationships 244 between objects 240. The following is an example of an SQL query that may be used to define a relationship 244 between objects 240:

"select $PROPERTIES from $OBJECT as $NAME $JOIN $WHERE"

In this example, the $ values represent variables that may be filled in at run-time to define the relationship 244 from one object 240 to another. For example, the properties 242 of an object 240 associated with the relationship may be specified by the $PROPERTIES and $OBJECT variables. The selected properties of the object 240 may be joined with the properties 242 of another object 240, as specified at runtime by the $JOIN variable. The $WHERE variable may specify criteria that must be satisfied by a particular instance of the object 240 for that instance to be included among the selected instances. The $NAME variable may specify the name of the new object/relationship. In this manner, properties 242 of one object 240 may be joined with properties 242 of another object 240 based on certain criteria, resulting in a relationship 244 between the two objects 240. In particular embodiments, relationships 244 may be defined using existing database commands, such as the "select" command referenced above. In some embodiments, relationships 244 may also be defined using custom procedures, such as a custom "stored procedure" of a relational database system.

Figure 3:
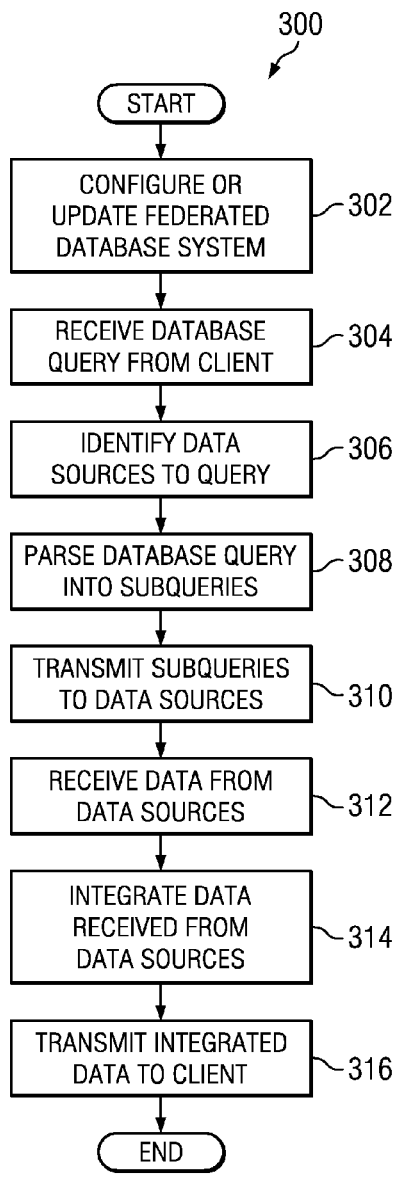
FIG. 3 is a flowchart illustrating a method of processing a database query by a federated database system, in accordance with a particular embodiment.

FIG. 3 is a flowchart, designated generally by reference number 300, illustrating a method of processing a database query by a federated database system, in accordance with a particular embodiment. The federated database system may be a DBMS capable of integrating data from various different data sources into a single virtual database of federated data. The method begins at step 302 where a federated database system is initially configured or updated. Initial configuration of the federated database system may involve acquiring and processing configuration metadata associated with the federated data. In some embodiments, the federated database system may consult an initial configuration file to identify the locations of the requisite configuration metadata, and the configuration metadata may then be retrieved from the specified locations. In such embodiments, the configuration metadata may reside locally on the federated database system and/or may reside at one or more remote locations, such as one or more of the data sources. Thus, while some data sources may supply the underlying data that is integrated by the federated database system, some data sources may supply the configuration metadata used to configure the federated database system. In embodiments where the configuration metadata resides, at least in part, at one or more remote locations, the configuration metadata may need to be retrieved from the particular locations by the federated database system. The configuration metadata retrieved from each location may be comprehensive or may specify additional locations of configuration metadata requiring retrieval. The federated database system may recursively retrieve configuration metadata from the various locations until reaching a steady state indicating that all the necessary configuration metadata has been retrieved. The comprehensive collection of configuration metadata may be combined into a single set of configuration metadata.

In step 304, a database query is received from a client system. The database query from the client system may be a request to access certain data that may reside on one or more of the data sources. In particular embodiments, the database query may be provided using a query language, such as SQL, or may be provided using any other suitable mechanism for querying a database. At step 306, the federated database system may consult the configuration metadata to determine how to respond to the database query. For example, the underlying data responsive to the database query may reside on one or more of the constituent data sources. The federated database system may consult the configuration metadata to identify the various data sources that need to be queried to satisfy the database query. At step 308, the federated database system may parse the database query into one or more subqueries for each of the identified data sources that need to be queried. In particular embodiments, each subquery may not necessarily be specified using the same query language as used to specify the primary database query. This is because the data sources may be autonomous, and the particular query language for each data source may depend on the implementation of the particular data source. As an example, the data sources may include an Oracle database, an SQL database, a web service, and/or a file. The federated database system may generate the subquery for each data source using the appropriate query language, or method, of accessing each particular data source. At step 310, each subquery is transmitted to the appropriate data source, where each data source may retrieve the underlying data responsive to the received subquery and may transmit the responsive data to the federated database system. At step 312, the federated database system may receive the responsive data from the queried data sources. After receiving a response from each data source, at step 314 the federated database system may integrate the received data. In particular embodiments, the specific manner of integrating the data may be specified in part by the database query from the client system, and/or in part by the configuration metadata. As an example, the database query from the client system may request some combination of instances of object X and object Y, such as a union over certain properties of objects X and object Y. The configuration metadata may indicate that the underlying data for instances of object X is provided by multiple data sources, while the underlying data for instances of object Y is provided by a single data source. The federated database system may combine the data from multiple data sources as specified by the configuration metadata to form instances of object X. The federated database system may then combine the instances of object X with the instances of object Y as specified by the original database query. After integrating the data in this manner, at step 316 the federated database system may transmit the integrated data to the client system. The method may restart at step 304 upon receiving another database query. In particular embodiments, the method may also restart at step 302 to allow the federated database system to be updated after the initial configuration to reflect additional configuration metadata associated with an updated configuration.

Figure 4:
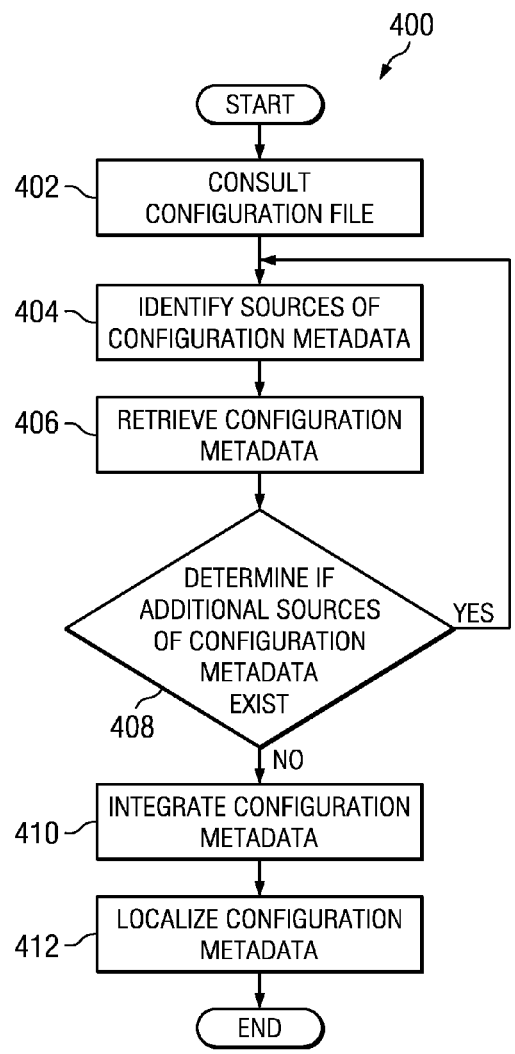
FIG. 4 is a flowchart illustrating a method of populating the configuration metadata of a federated database system, in accordance with a particular embodiment.

FIG. 4 is a flowchart, designated generally by reference number 400, illustrating a method of populating the configuration metadata of a federated database system, in accordance with a particular embodiment. The federated database system may use configuration metadata to integrate data from various different data sources into a single virtual database of federated data. Configuration metadata may specify information associated with the federated database system, such as the definitions of the objects and/or properties of the federated data, the relationships among the objects, and/or the data sources that provide the underlying data necessary to populate the objects of the federated data. Upon receiving a database query, the federated database system may consult the configuration metadata to determine how to respond to the database query. Accordingly, the configuration metadata may need to be populated before the federated database system may be able to respond to database queries.

Populating the configuration metadata may begin at step 402 where a configuration file is consulted. The configuration file may contain information used to configure the federated database system, such as information necessary to populate the configuration metadata. For example, the configuration metadata may reside at one or more locations and may need to be retrieved from the various locations and integrated into a single comprehensive collection of configuration metadata. The configuration file may specify the locations of some or all of the constituent sources of configuration metadata necessary to populate the comprehensive collection of configuration metadata. At step 404, the initial locations of the configuration metadata are identified based on the information in the configuration file. In particular embodiments, the configuration file may itself contain some of the configuration metadata but may identify other locations containing additional configuration metadata.

At step 406, the configuration metadata is retrieved from the locations specified by the configuration file. At step 408, it is determined whether there are additional sources of configuration metadata. The retrieved configuration metadata from each location specified by the configuration file may be a comprehensive set or may be incomplete, requiring additional configuration metadata to be obtained. In particular embodiments, the retrieved configuration metadata may itself specify one or more sources of additional configuration metadata. If it is determined that there are additional sources of configuration metadata, the method may return to step 406 to retrieve the additional configuration metadata. The method may continue to recursively retrieve configuration metadata and determine if there are additional sources of configuration metadata at steps 406 and 408 until reaching a steady state indicating that all the requisite configuration metadata has been retrieved. After reaching a steady state, at step 410 a comprehensive collection of configuration metadata may be formed by integrating each constituent set of configuration metadata retrieved from the various locations. In particular embodiments, the configuration metadata may formed by the union of all the constituent sets of configuration metadata. At step 412, the configuration metadata may be "localized" with respect to a particular language. Localization may allow the federated database system to respond to database queries in multiple languages. In some embodiments, the localization may be accomplished by forming a union of configuration metadata with a localization table.

In particular embodiments, the method may restart at step 402 and/or 404 to allow the federated database system to be re-configured to reflect an updated configuration. As an example, the federated database system may need to be re-configured to integrate new data sources or define new relationships among the data from the existing data sources. In particular embodiments, an updated configuration may be specified by modifying the configuration file to identify additional configuration metadata associated with an updated configuration. The method may then retrieve and integrate the additional configuration metadata with the existing configuration metadata in the manner described with respect to steps 406 through 412.

Methods 300 and 400 may be implemented using any of the systems of FIGS. 1 and 2, and/or any other suitable system operable to implement methods 300 and 400. As such, the preferred initialization point for methods 300 and 400 and the order of their steps may depend on the implementation chosen. In some embodiments, some steps of methods 300 and 400 may be optionally omitted, repeated, combined, and/or performed in another order. Additionally, in some embodiments, some steps of methods 300 and 400 may be executed in parallel with other steps of methods 300 and 400.

In certain embodiments, methods 300 and 400, and/or functionality of the systems of FIGS. 1 and 2, may be implemented partially or fully in software embodied in computer-readable media. For the purposes of this disclosure, computer-readable media may include any transitory or non-transitory instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as any combination of the foregoing.

Numerous other changes, substitutions, variations, alterations and modifications may be ascertained by those skilled in the art and it is intended that some or all such changes, substitutions, variations, alterations and modifications may fall within the spirit and scope of the appended claims. Moreover, embodiments are not intended to be limited in any way by any statement in the specification that is not otherwise reflected in the claims.

What is claimed is:

1. A method, comprising:
  retrieving first configuration metadata associated with a database from a first data source, wherein the database is a federated database capable of integrating multiple data sources;
  initializing a database management system with the first configuration metadata, wherein the database management system is operable to access data from the first data source;
  determining whether the data from the first data source identifies at least one additional data source containing additional configuration metadata associated with the database;
  recursively retrieving the additional configuration metadata from the at least one additional data source until reaching a steady state indicating that all configuration metadata has been retrieved;
  combining the first configuration metadata and each of the additional configuration metadata into a set of combined configuration metadata; and
  dynamically reconfiguring the database to integrate data from the at least one additional data sources, wherein dynamically reconfiguring the database comprises:
    receiving a modification to a configuration file, the configuration file specifying the at least one additional data source comprising additional configuration metadata;
    retrieving the additional configuration metadata from the at least one data source; and
    reinitializing the database management system with the additional configuration metadata, wherein the database management system is operable to access data from the at least one additional data source.

2. The method of claim 1, further comprising:
  specifying, using a database command, one or more relationships among data stored on the multiple data sources, wherein the database command comprises one or more variables; and
  providing one or more values for the one or more the variables when the database command is executed.

3. The method of claim 1, further comprising:
  receiving a database query;
  analyzing the combined configuration metadata to identify data sources to query for responding to the database query;
  generating one or more subqueries associated with the identified data sources;
  transmitting the one or more subqueries to the identified data sources;
  receiving data responsive to the one or more subqueries from the identified data sources;
  integrating the received data into the database; and
  providing the integrated data to a client system.

4. The method of claim 3, wherein generating one or more subqueries associated with the identified data sources comprises using a template language to transform the database query into a new query composed of one or more subqueries.

5. The method of claim 1, wherein a configuration file specifies the first data source comprising first configuration metadata.

6. The method of claim 1, wherein the first configuration metadata specifies the at least one additional data source containing the additional configuration metadata associated with the database.

7. The method of claim 1, wherein the first data source and the at least one additional data source are located on a communications network.

8. A system, comprising:
an interface operable to:
retrieve, from a first data source, first configuration metadata associated with a database, wherein the database is a federated database capable of integrating multiple data sources;
recursively retrieve, from at least one additional data source, additional configuration metadata associated with a database until reaching a steady state indicating that all configuration metadata has been retrieved; and
a processor operable to:
initialize a database management system with the first configuration metadata, wherein the database management system is operable to access data from the first data source;
determine whether the data from the first data source identifies at least one additional data source containing additional configuration metadata associated with the database;
combine the first configuration metadata and each of the additional configuration metadata into a set of combined configuration metadata; and
dynamically reconfigure the database to integrate data from the at least one additional data sources, wherein dynamically reconfiguring the database comprises:
receiving a modification to a configuration file, the configuration file specifying the at least one additional data source comprising additional configuration metadata;
retrieving the additional configuration metadata from the at least one data source; and
reinitializing the database management system with the additional configuration metadata, wherein the database management system is operable to access data from the at least one additional data source.

9. The system of claim 8, wherein the processor is further operable to:
specify, using a database command, one or more relationships among data stored on the multiple data sources, wherein the database command comprises one or more variables; and
provide one or more values for the one or more the variables when the database command is executed.

10. The system of claim 8, wherein:
the interface is further operable to receive a database query; and
the processor is further operable to:
determine a response to the database query based on the combined configuration metadata;
analyze the combined configuration metadata to identify data sources to query for responding to the database query;
generate the one or more subqueries associated with the identified data sources; transmit the one or more subqueries to the identified data sources;
receive data responsive to the one or more subqueries from the identified data sources;
integrate the received data into the database; and
provide the integrated data to a client system.

11. The system of claim 10, wherein the processor operable to generate one or more subqueries associated with the identified data sources comprises the processor operable to use a template language to transform the database query into a new query composed of one or more subqueries.

12. The system of claim 8, wherein a configuration file specifies the first data source comprising first configuration metadata.

13. The system of claim 8, wherein the first configuration metadata specifies the at least one additional data source containing the additional configuration metadata associated with the database.

14. The system of claim 8, wherein the first data source and the at least one data source are located on a communications network.

15. Logic embodied in a non-transitory computer readable medium, the logic, when executed by a processor, operable to:
retrieve first configuration metadata associated with a database from a first data source, wherein the database is a federated database capable of integrating multiple data sources;
initialize a database management system with the first configuration metadata, wherein the database management system is operable to access data from the first data source;
determine whether the data from the first data source identifies at least one additional data source containing additional configuration metadata associated with the database;
recursively retrieve the additional configuration metadata from the at least one additional data source until reaching a steady state indicating that all configuration metadata has been retrieved;
combine the first configuration metadata and each of the additional configuration metadata into a set of combined configuration metadata; and
dynamically reconfigure the database to integrate data from the at least one additional data sources, wherein dynamically reconfiguring the database comprises:
receiving a modification to a configuration file, the configuration file specifying the at least one additional data source comprising additional configuration metadata;
retrieving the additional configuration metadata from the at least one data source; and
reinitializing the database management system with the additional configuration metadata, wherein the database management system is operable to access data from the at least one additional data source.

16. The computer readable medium of claim 15, wherein the logic is further operable to:
specify, using a database command, one or more relationships among data stored on the multiple data sources, wherein the database command comprises one or more variables; and
provide one or more values for the one or more the variables when the database command is executed.

17. The computer readable medium of claim 15, wherein the logic is further operable to:
receive a database query;
analyze the combined configuration metadata to identify data sources to query for responding to the database query;
generate the one or more subqueries associated with the identified data sources;
transmit the one or more subqueries to the identified data sources;

receive data responsive to the one or more subqueries from the identified data sources;

integrate the received data into the database; and provide the integrated data to a client system.

18. The computer readable medium of claim 17, wherein logic operable to generate one or more subqueries associated with the identified data sources further comprises logic operable to use a template language to transform the database query into a new query composed of one or more subqueries.

19. The computer readable medium of claim 15, wherein a configuration file specifies the first data source comprising configuration metadata.

20. The computer readable medium of claim 15, wherein the first configuration metadata specifies the at least one additional data source comprising the additional configuration metadata.

21. The computer readable medium of claim 15, wherein the first data source and the at least one additional data source are located on a communications network.

* * * * *